3,376,241
PROCESS OF PREPARING WATER-SOLUBLE ALKYD RESINS

Adolf Adriaan Que, Rijswijk, South Holland, Netherlands, assignor to N.V. Chemische Industrie Synres, Hook of Holland, Netherlands, a corporation of the Netherlands
No Drawing. Filed Dec. 12, 1963, Ser. No. 329,990
Claims priority, application Netherlands, Dec. 28, 1962, 287,308
8 Claims. (Cl. 260—20)

In the last few years water thinnable alkyd resin products have been in ever increasing demand. This is understandable since the use of water thinnable alkyd resins enable the preparation of lacquers and paints which contain water as solvent and thinner, so that they are relatively cheap, free of fire hazards and free of harmful vapors and offensive odor.

For the preparation of water thinnable alkyd resins various procedures have been followed. They all have in common the fact that the preparation of such products is intended to have a high content of hydrophylic groups, such as ester, ether, carbonyl, and particularly hydroxyl groups. Thus, a very important method consists in the use of polyhydric alcohols having a relatively large number of hydroxyl groups with respect to the polyvalent acid, such as pentaerythritol, di- and tri-pentaerythritol, etc., as a result of which alkyd resins having a large number of free hydroxyl groups are formed, by reason of which they can be diluted with water. Another method consists in forming a polyethylene glycol in the polycondensation product of the polyvalent acid and the polyhydric alcohol by esterifying the acid with a mixture of a normal polyhydric alcohol and a polyethylene glycol. This method yields a product which is hydrophylic on account of the presence of hydroxyl groups and ether bridges throughout the molecule. The reaction of a preformed alkyd resin with a polyethylene glycol has not produced such good results.

Often the water thinnable alkyd resins are also modified by reacting them during or after their preparation with drying or non-drying oils, oil fatty acids, resin acids, or also with phenol, urea or melamine formaldehyde resins, whereby the film forming properties, such as hardness, toughness and flexibility are improved.

It is a disadvantage of the known water thinnable alkyd resins that in general they produce unstable aqueous dispersions and films with a bad gloss, poor hardness and poor water resistance.

The present invention provides for a method of preparing water soluble alkyd resins which do not have the above disadvantages.

The invention consists in that the polyvalent acid component has at least one trivalent acid or an acid of higher basicity in an amount of at least 10 mole percent of the total acid component, and that the equivalent ratio of acid/polyhydric alcohol is chosen so as to obtain a hydroxyl number of 25–200 and an acid number of 25–100, and the alkyd resin is neutralized with ammonia or an amine.

Preferably the ratio of polyvalent acid/polyhydric alcohol is selected so as to obtain a product having a hydroxyl number of 50–125 and an acid number of 50–75.

The alkyd resins according to the invention have very highly polar COO-groups (carboxylate) distributed along the full length of the chain, which results in good water solubility and allows the use of very low hydroxyl numbers, which at the same time promotes the water resistance of the film. These COO-groups enable the alkyd resins to dissolve into limpid solutions which are stable on storage, without co-use of alcohols, ether alcohols, or similar inflammable solvents. After being blended with water soluble melamine, urea or phenolaldehyde resins, these solutions can be enameled to form films having good water resistance, good hardness, perfect adhesion, high impact resistance and high finish gloss. The explanation for this high finish-gloss is that the resin in the film does not precipitate, but remains compatible until the last moment of hardening.

Furthermore it has been found that due to their high polarity-in-solution resulting from the COO-groups along the entire chain, the resins prepared have excellent moistening properties, so that the milling time of added pigments can be considerably reduced and at the same time the pigment volume concentration can be increased.

As examples of trivalent acids and acids of higher basicity (or acid anhydrides) can be mentioned; citric acid, maleinised unsaturated fatty acids, maleinised colophony, etc.

As bivalent acids the conventional acids (anhydrides) are used: phthalic acid (anhydride), isophthalic acid, adipic acid, succinic acid, azelaic acid, sebasic acid, etc., while as polyhydric alcohols the conventional alcohols are used as well, such as: glycol, propane diol, glycerol, pentaerythritol, neopentyl glycol, etc.

The water soluble alkyd resins according to the invention can be used for the preparation of coating compositions, impregnants and adhesives. If the resins contain unsaturated fatty acids, they can be air dried to form hard and flexible films by means of siccatives. Furthermore, as has been said above, they can be used as enamels after being blended with water soluble melamin, urea, or phenol aldehyde resins. For the production of paints and lacquers, pigments can be added, as well as the conventional additives. This also applies to the other uses.

The invention is further illustrated by the following examples.

EXAMPLE I 128 parts by weight (⅓ mole) of maleinised soya-oil fatty acids and 74 parts by weight (½ mole) of phthalic acid anhydride are esterified with 106 parts by weight (⅜₁₀ mole) of the monoglyceride of soya-oil fatty acids and 72 parts by weight (0.8 mole) of (1,3) butane diol. The equivalent value of the starting composition (ratio COOH/OH) is 0.9.

At an acid number of 60–65 (OH number 91–96) the resin is bright and after neutralization with ammonia or amines to a pH of 7.5 in the ratio of 1:3 gives a clear solution in water.

EXAMPLE II 128 parts by weight (⅓ mole) of maleinised soya-oil fatty acid and 74 parts by weight (½ mole) of phthalic acid anhydride are esterified with 97 parts by weight (0.275 mole) of the monoglyceride of soya-oil fatty acid and 57 parts by weight (0.635 mole) of (1,3) butane diol. The equivalent value of the starting composition (ratio COOH/OH) is 1.1.

At an acid number of 75–80 (OH number 45–50) the resin, after neutralization with ammonia or amines, still gives a clear solution in the ratio 1:3.

EXAMPLE III 128 parts by weight (⅓ mole) of maleinised soya-oil fatty acid and 438 parts by weight (3 moles) of adipic acid are esterified with 241 parts by weight (3.89 moles) of ethylene glycol. The equivalent value of the starting composition (ratio COOH/OH) is 0.9.

At an acid number of 71 (OH number 134) the resin still gives a clear solution in water in the ratio 1:3.

The two next examples serve as examples of comparison. The tribasic acid in these examples is replaced by a dibasic acid.

EXAMPLE IV 73 parts by weight (0.5 mole) of adipic acid and 74 parts by weight (0.5 mole) of phthalic acid anhydride are esterified with 106 parts by weight (3/10 mole) of the monoglyceride of soya-oil fatty acid and 72 parts by weight (0.8 mole) of (1,3) butane diol. The equivalent value of the starting composition COOH/OH is 0.9.

It was found that in the entire range of acid numbers to values lower than 60 (OH number 98) the resin, after neutralization with ammonia or amines, does not give a clear solution in water in a ratio as high as 1:1. Hazy solutions are formed.

EXAMPLE V 73 parts by weight (0.5 mole) of adipic acid and 74 parts by weight (0.5 mole) of phthalic acid anhydride are esterified with 97 parts by weight (0.275 mole) of the monoglyceride of soya-oil fatty acid and 57 parts by weight (0.635 mole) of (1,3) butane diol. The equivalent value of the starting composition (COOH/OH) is 1.1.

At an acid number of 90–95 (OH number 53–58) the resin, after neutralization with ammonia or amines, is no longer soluble in water in the ratio 1:3.

I claim:

1. A process for preparing water-soluble alkyd resins, said process comprising condensing a polyhydric alcohol with a polycarboxylic acid or anhydride, said polycarboxylic acid or anhydride comprising 10–40 mol percent of at least one tricarboxylic acid or acid of higher basicity selected from the group consisting of citric acid, a maleinized unsaturated fatty acid and maleinized colophony wherein the equivalent ratio of polycarboxylic acid or anhydride to polyhydric alcohol is such that a water-soluble alkyd resin is obtained having a hydroxy number of 25–200 and an acid number of 25–100 and neutralizing the thusly produced resin by the addition of ammonia or an amine.

2. The process as claimed in claim 1, wherein the hydroxy number is 50–125 and the acid number is 50–75.

3. The process as claimed in claim 1, wherein the tricarboxylic acid is citric acid.

4. The process as claimed in claim 1, wherein the tricarboxylic acid or acid of higher basicity is a maleinized unsaturated fatty acid.

5. The process as claimed in claim 1, wherein the tricarboxylic acid or acid of higher basicity is maleinized colophony.

6. A process for producing enamels, said process comprising mixing the resin prepared according to claim 1 with a resin selected from the group consisting of water-soluble urea resins, melamine resins and phenol aldehyde resins.

7. The process as claimed in claim 1, comprising modifying the alkyd resin by adding thereto a drying fatty oil, a non-drying fatty oil or an acid selected from the group consisting of drying oil fatty acids, and non-drying oil fatty acids.

8. A process for producing air-driable lacquers, said process comprising mixing a siccative with the resin prepared according to claim 7, the polycarboxylic acid of said resin comprising at least one unsaturated acid.

References Cited

UNITED STATES PATENTS

| | | | |
|---|---|---|---|
| 3,213,063 | 10/1965 | Horan et al. | 260—75 |
| 3,224,992 | 12/1965 | Stephens. | |
| 1,998,744 | 4/1935 | Ubben. | |
| 2,992,197 | 7/1961 | Boller. | |
| 3,021,308 | 2/1962 | Caywood et al. | 260—22 |
| 3,053,783 | 9/1962 | Broadhead et al. | |
| 3,070,256 | 12/1962 | Bremmer et al. | 260—22 |
| 3,108,085 | 10/1963 | Broadhead | 260—22 |
| 3,120,499 | 2/1964 | Broadhead | 260—22 |
| 3,123,578 | 3/1964 | Kraft | 260—22 |

DONALD E. CZAJA, *Primary Examiner.*

LEON J. BERCOVITZ, *Examiner.*

R. W. GRIFFIN, *Assistant Examiner.*